(12) United States Patent
Bhatia et al.

(10) Patent No.: US 11,826,910 B2
(45) Date of Patent: Nov. 28, 2023

(54) DIRECT DRIVE END-EFFECTORS WITH PARALLEL KINEMATICS

(71) Applicant: Carnegie Mellon University, Pittsburgh, PA (US)

(72) Inventors: Ankit Bhatia, Pittsburgh, PA (US); Aaron Johnson, Pittsburgh, PA (US); Matthew T. Mason, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 217 days.

(21) Appl. No.: 17/326,719

(22) Filed: May 21, 2021

(65) Prior Publication Data
US 2022/0371188 A1 Nov. 24, 2022

Related U.S. Application Data

(60) Provisional application No. 63/190,973, filed on May 20, 2021.

(51) Int. Cl.
*B25J 15/00* (2006.01)
*B25J 9/16* (2006.01)
(Continued)

(52) U.S. Cl.
CPC ............... *B25J 9/1612* (2013.01); *B25J 9/12* (2013.01); *B25J 9/1633* (2013.01); *B25J 13/088* (2013.01);
(Continued)

(58) Field of Classification Search
CPC . B25J 9/1612; B25J 9/12; B25J 9/1633; B25J 13/088; B25J 15/0009;
(Continued)

(56) References Cited

U.S. PATENT DOCUMENTS 4,425,818 A * 1/1984 Asada .................... B25J 17/025
310/112
4,675,977 A * 6/1987 Kolblin .................. B23Q 3/157
483/49

(Continued)

FOREIGN PATENT DOCUMENTS

WO        2020190164 A1    9/2020
WO   WO-2020190164 A1 *  9/2020

OTHER PUBLICATIONS

Bhatia et al., "Direct Drive Hands: Force Motion Transparency in Gripper Design", Manipulation Lab, available at <https://www.youtube.com/watch?v=xnHtbOXP3U4>, May 2019, 3 pages.
(Continued)

*Primary Examiner* — Jaime Figueroa
(74) *Attorney, Agent, or Firm* — THE WEBB LAW FIRM

(57) ABSTRACT

A gripper includes at least one movable finger. Each movable finger includes a first motor, a second motor, a first motor link having a first end coupled to a rotor of the first motor, a second motor link having a first end coupled to a rotor of the second motor, a finger link having a first end in pivotal connection with a second end of the second motor link and a gripper pad, and a connecting link having a first end in pivotal connection with a second end of the first motor link and a second end in pivotal connection with the finger link. The gripper further includes at least one controller programmed or configured to actuate the first motor and the second motor of each of the at least one movable finger.

14 Claims, 10 Drawing Sheets

(51) Int. Cl.
  *B25J 9/12* (2006.01)
  *H02P 29/64* (2016.01)
  *B25J 13/08* (2006.01)
(52) U.S. Cl.
  CPC ....... *B25J 15/0009* (2013.01); *B25J 15/0028* (2013.01); *H02P 29/64* (2016.02)
(58) Field of Classification Search
  CPC .. B25J 15/0028; B25J 15/0266; B25J 15/022; H02P 29/64; H02P 5/46; G05B 2219/39409; G05B 2219/39487
  USPC ................. 700/245–264; 318/568.11–568.25
  See application file for complete search history.

(56) References Cited

U.S. PATENT DOCUMENTS

| | | | | |
|---|---|---|---|---|
| 4,720,897 | A * | 1/1988 | Orrell | B23B 39/003 408/124 |
| 4,762,016 | A * | 8/1988 | Stoughton | B25J 9/06 475/5 |
| 4,808,898 | A * | 2/1989 | Pearson | G05B 19/4202 318/599 |
| 4,884,941 | A | 12/1989 | Kazerooni | |
| 5,203,855 | A * | 4/1993 | Givler | B23B 39/16 408/1 R |
| 5,210,935 | A * | 5/1993 | Givler | B21J 15/142 29/818 |
| 5,314,293 | A | 5/1994 | Carlisle et al. | |
| 5,432,395 | A * | 7/1995 | Grahn | A61F 2/70 310/323.02 |
| 5,528,955 | A | 6/1996 | Hannaford et al. | |
| 5,642,469 | A * | 6/1997 | Hannaford | B25J 13/02 700/264 |
| 5,816,105 | A * | 10/1998 | Adelstein | B25J 9/106 345/161 |
| RE37,528 | E * | 1/2002 | Hannaford | G06F 3/016 345/161 |
| 6,428,266 | B1 | 8/2002 | Solomon et al. | |
| 6,762,745 | B1 * | 7/2004 | Braun | G06F 3/0383 318/590 |
| 7,417,358 | B2 * | 8/2008 | Sugahara | H02N 2/026 310/328 |
| 8,231,158 | B2 * | 7/2012 | Dollar | B25J 15/12 294/111 |
| 8,424,942 | B2 * | 4/2013 | Park | B25J 15/0266 901/38 |
| 8,585,111 | B2 * | 11/2013 | Nammoto | B25J 15/10 901/38 |
| 8,654,498 | B2 * | 2/2014 | Takeuchi | B62M 6/50 361/140 |
| 8,827,337 | B2 * | 9/2014 | Murata | B25J 15/0009 294/111 |
| 9,234,803 | B2 * | 1/2016 | Cheng | G06F 15/00 |
| 9,505,132 | B1 * | 11/2016 | Bingham | B25J 9/1694 |
| 9,532,877 | B2 * | 1/2017 | Holgate | A61F 2/3094 |
| 9,566,205 | B2 * | 2/2017 | Patoglu | B25J 9/0048 |
| 9,645,565 | B2 * | 5/2017 | Nilsson | B25J 9/1641 |
| 9,827,677 | B1 * | 11/2017 | Gilbertson | B25J 9/046 |
| 9,908,238 | B2 * | 3/2018 | Nilsson | B25J 9/1653 |
| 10,029,369 | B1 * | 7/2018 | Carlisle | B25J 9/042 |
| 10,263,562 | B2 * | 4/2019 | Ito | H02P 29/60 |
| 10,286,549 | B2 * | 5/2019 | Kilibarda | B25J 15/0047 |
| 10,575,970 | B2 * | 3/2020 | Holgate | A61F 2/70 |
| 10,926,756 | B2 * | 2/2021 | Dastous | B60W 30/09 |
| 11,000,945 | B2 * | 5/2021 | Asada | B25J 9/0006 |
| 11,104,008 | B2 * | 8/2021 | Yerazunis | B25J 15/0009 |
| 2006/0066177 | A1 * | 3/2006 | Sugahara | H02N 2/0015 310/323.17 |
| 2008/0188871 | A1 | 8/2008 | Smith et al. | |
| 2009/0302626 | A1 * | 12/2009 | Dollar | B25J 15/12 294/106 |
| 2011/0056321 | A1 * | 3/2011 | Sim | B25J 9/1025 74/490.04 |
| 2011/0120255 | A1 * | 5/2011 | Chen | B25J 17/0258 901/29 |
| 2011/0148132 | A1 * | 6/2011 | Park | B25J 15/10 294/106 |
| 2013/0057004 | A1 * | 3/2013 | Murata | B25J 15/0009 294/213 |
| 2014/0074243 | A1 * | 3/2014 | Holgate | A61F 2/30 623/18.11 |
| 2014/0312813 | A1 * | 10/2014 | Murchie | H02P 6/34 318/400.03 |
| 2015/0248121 | A1 * | 9/2015 | Nilsson | B25J 9/1641 318/569 |
| 2015/0273687 | A1 * | 10/2015 | Greene | B25J 15/086 901/1 |
| 2015/0306768 | A1 * | 10/2015 | Liang | G05B 19/406 703/2 |
| 2016/0008976 | A1 * | 1/2016 | Nagatsuka | B25J 9/163 700/253 |
| 2016/0051433 | A1 * | 2/2016 | Patoglu | B25J 9/0048 606/130 |
| 2016/0221189 | A1 * | 8/2016 | Nilsson | B25J 9/1653 |
| 2017/0095355 | A1 * | 4/2017 | Holgate | A61F 2/3094 |
| 2017/0151680 | A1 * | 6/2017 | Liang | B25J 9/1674 |
| 2017/0173789 | A1 * | 6/2017 | Kilibarda | B25J 19/023 |
| 2018/0021941 | A1 * | 1/2018 | Berger | B25J 5/007 180/21 |
| 2018/0264660 | A1 * | 9/2018 | Bergeron | B25J 9/046 |
| 2018/0354135 | A1 * | 12/2018 | Carlisle | B25J 9/1676 |
| 2018/0370021 | A1 * | 12/2018 | Asada | B25J 9/0006 |
| 2019/0052219 | A1 * | 2/2019 | Hara | F04D 27/004 |
| 2020/0039064 | A1 * | 2/2020 | McKinley | B25J 17/0208 |
| 2020/0204046 | A1 * | 6/2020 | Yamada | H02K 1/20 |
| 2020/0306995 | A1 * | 10/2020 | Yerazunis | B25J 15/0009 |
| 2022/0126443 | A1 * | 4/2022 | Kim | B25J 9/1612 |
| 2022/0134549 | A1 * | 5/2022 | Nakamura | B25J 9/1612 700/250 |
| 2022/0203554 | A1 * | 6/2022 | Abe | B25J 15/0009 |

OTHER PUBLICATIONS

Bhatia et al., "Direct Drive Hands: Force Motion Transparency in Gripper Design", Robotics: Science and Systems, Jun. 2019, 10 pages.
Campion et al., "The Pantograph Mk-II: A Haptic Instrument", International Conference on Intelligent Robots and Systems, 2005, pp. 723-728.
Dollar et al., "The Highly Adaptive SDM Hand: Design and Performance Evaluation", The International Journal of Robotics Research, 2010, pp. 585-597, vol. 29, No. 5.
Ebner et al., "A direct-drive hand: Design, Modeling and Control", IEEE International Conference on Robotics and Automation, 1995, pp. 1668-1673.
Kazerooni, "Direct-Drive Active Compliant End Effector (Active Rcc)", IEEE Journal of Robotics and Automation, Jun. 1988, pp. 324-333, vol. 4, No. 3.
Lorenz et al., "A Direct-Drive, Robot Parts, and Tooling Gripper with High-Performance Force Feedback Control", IEEE Transactions on Industry Applications, Mar./Apr. 1991, pp. 275-281, vol. 27, No. 2.
Ma et al., "A Modular, Open-Source 3D Printed Underactuated Hand", 2013 International Conference on Robotics and Automation, 2013, pp. 2737-2743.
Namiki et al., "Development of a High-speed Multifingered Hand System and Its Application to Catching", Intl. Conference on Intelligent Robots and Systems, Oct. 2003, pp. 2666-2671.
Ulrich, "Grasping With Mechanical Intelligence", PhD thesis, University of Pennsylvania Department of Computer and Information Science, Dec. 1989, 80 pages.

* cited by examiner

DIRECT DRIVE END-EFFECTORS WITH PARALLEL KINEMATICS

CROSS-REFERENCE TO REPLATED APPLICATIONS

This application claims priority to U.S. Provisional Patent Application No. 63/190,973, filed on May 20, 2021, the disclosure of which is incorporated by reference herein in its entirety.

GOVERNMENT LICENSE RIGHTS

This invention was made with Government support under 1813920 awarded by the National Science Foundation. The Government has certain rights in the invention.

BACKGROUND

1. Field

This disclosure relates generally to robotic grippers and, in non-limiting embodiments, to robotic grippers with direct drive actuation.

2. Technical Considerations

Robotic grippers have a wide range of utilization across many industries. Robotic grippers are generally built to be similar to a vise. They provide the ability to securely grasp a wide range of object weights and provide a wide range of forces. To achieve the gripping forces required in many applications, conventional grippers often use a high gear-ratio worm screw or similar transmission to multiply the torque output of the motor. However, when utilizing a high gear-ratio worm screw, the gripper is only capable of rigid clamping. This can make it difficult for a gripper to pick up a fragile object or to react to the environment. Furthermore, the transmission inherently reduces the speed of the gripper as a consequence of multiplying the motor force. As such, in order for a traditional gripper to pick an object off of a surface, the gripper must approach the table very slowly and detect contact with the table utilizing a force/torque sensor, contact sensor, or by monitoring servo error in order to avoid crashing the gripper into the surface of the table. Gearboxes have sometimes been supplemented with series-elastic actuation and strain gauges to mitigate crashing and improve sensitivity, but these solutions present their own drawbacks and still limit the speed and dexterity of the gripper.

SUMMARY

Non-limiting embodiments or aspects of the present disclosure are directed to a gripper including at least one movable finger. Each movable finger includes a first motor, a second motor, a first motor link including a first end coupled to a rotor of the first motor, a second motor link including a first end coupled to a rotor of the second motor, a finger link including a first end in pivotal connection with a second end of the second motor link and a gripper pad, and a connecting link including a first end in pivotal connection with a second end of the first motor link and a second end in pivotal connection with the finger link. The gripper further includes at least one controller programmed or configured to actuate the first motor and the second motor of each of the at least one movable finger.

In non-limiting embodiments or aspects, the at least one movable finger includes two movable fingers facing toward one another such that actuation of the first motor and the second motor of the two movable fingers drives the gripper pads of the two movable fingers toward one another.

In non-limiting embodiments or aspects, the first motor link is coupled to the first motor such that rotation of the first motor at a first angular velocity causes rotation of the first motor link at the first angular velocity, and the second motor link is coupled to the second motor such that rotation of the second motor at a second angular velocity causes rotation of the second motor link at the second angular velocity.

In non-limiting embodiments or aspects, the gripper further includes an actuator configured to move the at least one movable finger in a first direction. The at least one controller is further programmed or configured to drive the actuator to move the at least one movable finger in the first direction toward a target surface, halt the actuator in response to determining that the at least one movable finger is in contact with the target surface, actuate the first motor and the second motor to move the gripper pad toward an object on the target surface, and, in response to determining that the at least one movable finger has grasped the object on the target surface, maintain a driving current on the first motor and the second motor to retain the object in the at least one movable finger.

In non-limiting embodiments or aspects, determining that the at least one movable finger is in contact with the target surface includes detecting angular displacement of at least one of the first motor and the second motor.

In non-limiting embodiments or aspects, determining that the at least one movable finger has grasped the object on the target surface includes detecting a load above a predetermined threshold on at least one of the first motor and the second motor.

In non-limiting embodiments or aspects, the controller is further programmed or configured to determine a winding temperature of at least one of the first motor and the second motor.

In non-limiting embodiments or aspects, the controller is further programmed or configured to release an object held by the at least one movable finger in response to determining that the winding temperature exceeds a predetermined threshold.

In non-limiting embodiments or aspects, the controller is further programmed or configured to predict a change in the winding temperature of at least one of the first motor and the second motor based on a planned movement of the at least one movable finger and alter the planned movement to prevent the winding temperature from exceeding a predetermined threshold.

Other non-limiting embodiments or aspects of the present disclosure are directed to a gripper including at least one movable finger. Each movable finger includes at least one motor, a plurality of interconnected links connected to the at least one motor, and, a gripper pad connected to the plurality of interconnected links. The gripper further includes an actuator configured to move the at least one movable finger in a first direction and a controller. The controller is programmed or configured to drive the actuator to move the at least one movable finger in the first direction toward a target surface, halt the actuator in response to determining that the at least one movable finger is in contact with the target surface, actuate the at least one motor of each of the at least one movable finger to move the gripper pad toward an object on the target surface, and in response to determining that the at least one movable finger has grasped the object on the target surface, maintain a driving current on the at least one motor to retain the object in the at least one movable finger.

In non-limiting embodiments or aspects, the controller is further programmed or configured to determine a winding temperature of the at least one motor.

In non-limiting embodiments or aspects, the controller is further programmed or configured to release the object held by the at least one movable finger in response to determining that the winding temperature exceeds a predetermined threshold.

In non-limiting embodiments or aspects, the controller is further programmed or configured to predict a change in the winding temperature of the at least one motor based on a planned movement of the at least one movable finger and alter the planned movement to prevent the winding temperature from exceeding a predetermined threshold.

Other non-limiting embodiments or aspects of the present disclosure are directed to a method for controlling a gripper. The method includes driving an actuator to move at least one movable finger of the gripper in a first direction toward a target surface, determining, with at least one processor, that the at least one movable finger is in contact with the target surface, halting the actuator in response to determining that the at least one movable finger is in contact with the target surface, actuating at least one motor of each of the at least one movable finger to move a gripper pad of each of the at least one movable finger toward an object on the target surface, determining, with at least one processor, that the at least one movable finger has grasped the object on the target surface, and, in response to determining that the at least one movable finger has grasped the object on the target surface, maintaining a driving current on the at least one motor to retain the object in the at least one movable finger.

In some non-limiting embodiments or aspects, the method further includes determining, with at least one processor, a winding temperature of the at least one motor.

In some non-limiting embodiments or aspects, the method further includes determining, with at least one processor, that the winding temperature exceeds a predetermined threshold, and, in response to determining that the winding temperature exceeds the predetermined threshold, releasing the object held by the at least one movable finger.

In some non-limiting embodiments or aspects, the method further includes predicting, with at least one processor, a change in the winding temperature of the at least one motor based on a planned movement of the at least one movable finger, and altering, with at least one processor, the planned movement to prevent the winding temperature from exceeding a predetermined threshold.

In some non-limiting embodiments or aspects, determining that the at least one movable finger is in contact with the target surface includes detecting angular displacement of the at least one motor.

In some non-limiting embodiments or aspects, determining that the at least one movable finger is in contact with the target surface includes detecting a load above a predetermined threshold on the at least one motor.

In some non-limiting embodiments or aspects, determining that the at least one movable finger has grasped the object on the target surface includes detecting a load above a predetermined threshold on at least one of the first motor and the second motor.

Further non-limiting embodiments or aspects are set forth in the following numbered clauses:

Clause 1: A gripper comprising: at least one movable finger, each movable finger comprising: a first motor; a second motor; a first motor link comprising a first end coupled to a rotor of the first motor; a second motor link comprising a first end coupled to a rotor of the second motor; a finger link comprising: a first end in pivotal connection with a second end of the second motor link; and a gripper pad; and a connecting link comprising: a first end in pivotal connection with a second end of the first motor link; and a second end in pivotal connection with the finger link; and at least one controller programmed or configured to actuate the first motor and the second motor of each of the at least one movable finger.

Clause 2: The gripper of clause 1, wherein the at least one movable finger comprises two movable fingers facing toward one another such that actuation of the first motor and the second motor of the two movable fingers drives the gripper pads of the two movable fingers toward one another.

Clause 3: The gripper of clause 1 or 2, wherein the first motor link is coupled to the first motor such that rotation of the first motor at a first angular velocity causes rotation of the first motor link at the first angular velocity, and wherein the second motor link is coupled to the second motor such that rotation of the second motor at a second angular velocity causes rotation of the second motor link at the second angular velocity.

Clause 4: The gripper of any of clauses 1 to 3, further comprising an actuator configured to move the at least one movable finger in a first direction, wherein the at least one controller is further programmed or configured to: drive the actuator to move the at least one movable finger in the first direction toward a target surface; halt the actuator in response to determining that the at least one movable finger is in contact with the target surface; actuate the first motor and the second motor to move the gripper pad toward an object on the target surface; and in response to determining that the at least one movable finger has grasped the object on the target surface, maintain a driving current on the first motor and the second motor to retain the object in the at least one movable finger.

Clause 5: The gripper of any of clauses 1 to 4, wherein determining that the at least one movable finger is in contact with the target surface comprises detecting angular displacement of at least one of the first motor and the second motor.

Clause 6: The gripper of any of clauses 1 to 5, wherein determining that the at least one movable finger has grasped the object on the target surface comprises detecting a load above a predetermined threshold on at least one of the first motor and the second motor.

Clause 7: The gripper of any of clauses 1 to 6, wherein the controller is further programmed or configured to determine a winding temperature of at least one of the first motor and the second motor.

Clause 8: The gripper of any of clauses 1 to 7, wherein the controller is further programmed or configured to release an object held by the at least one movable finger in response to determining that the winding temperature exceeds a predetermined threshold.

Clause 9: The gripper of any of clauses 1 to 8, wherein the controller is further programmed or configured to: predict a change in the winding temperature of at least one of the first motor and the second motor based on a planned movement of the at least one movable finger; and alter the planned movement to prevent the winding temperature from exceeding a predetermined threshold.

Clause 10: A gripper comprising: at least one movable finger, each movable finger comprising: at least one motor; a plurality of interconnected links connected to the at least one motor; and a gripper pad connected to the plurality of interconnected links; an actuator configured to move the at least one movable finger in a first direction; and a controller programmed or configured to: drive the actuator to move the at least one movable finger in the first direction toward a target surface; halt the actuator in response to determining that the at least one movable finger is in contact with the target surface; actuate the at least one motor of each of the at least one movable finger to move the gripper pad toward an object on the target surface; and in response to determining that the at least one movable finger has grasped the object on the target surface, maintain a driving current on the at least one motor to retain the object in the at least one movable finger.

Clause 11: The gripper of clause 10, wherein the controller is further programmed or configured to determine a winding temperature of the at least one motor.

Clause 12: The gripper of clause 10 or 11, wherein the controller is further programmed or configured to release the object held by the at least one movable finger in response to determining that the winding temperature exceeds a predetermined threshold.

Clause 13: The gripper of any of clauses 10 to 12, wherein the controller is further programmed or configured to: predict a change in the winding temperature of the at least one motor based on a planned movement of the at least one movable finger; and alter the planned movement to prevent the winding temperature from exceeding a predetermined threshold.

Clause 14: A method for controlling a gripper, the method comprising: driving an actuator to move at least one movable finger of the gripper in a first direction toward a target surface; determining, with at least one processor, that the at least one movable finger is in contact with the target surface; halting the actuator in response to determining that the at least one movable finger is in contact with the target surface; actuating at least one motor of each of the at least one movable finger to move a gripper pad of each of the at least one movable finger toward an object on the target surface; determining, with at least one processor, that the at least one movable finger has grasped the object on the target surface; and in response to determining that the at least one movable finger has grasped the object on the target surface, maintaining a driving current on the at least one motor to retain the object in the at least one movable finger.

Clause 15: The method of clause 14, further comprising: determining, with at least one processor, a winding temperature of the at least one motor.

Clause 16: The method of clause 14 or 15, further comprising: determining, with at least one processor, that the winding temperature exceeds a predetermined threshold; and in response to determining that the winding temperature exceeds the predetermined threshold, releasing the object held by the at least one movable finger.

Clause 17: The method of any of clauses 14 to 16, further comprising: predicting, with at least on processor, a change in the winding temperature of the at least one motor based on a planned movement of the at least one movable finger; and altering, with at least one processor, the planned movement to prevent the winding temperature from exceeding a predetermined threshold.

Clause 18: The method of any of clauses 14 to 17, wherein the determining that the at least one movable finger is in contact with the target surface comprises detecting angular displacement of the at least one motor.

Clause 19: The method of any of clauses 14 to 18, wherein the determining that the at least one movable finger is in contact with the target surface comprises detecting a load above a predetermined threshold on the at least one motor.

Clause 20: The method of any of clauses 14 to 19, wherein determining that the at least one movable finger has grasped the object on the target surface comprises detecting a load above a predetermined threshold on at least one of the first motor and the second motor.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE INVENTION

Figure 1:
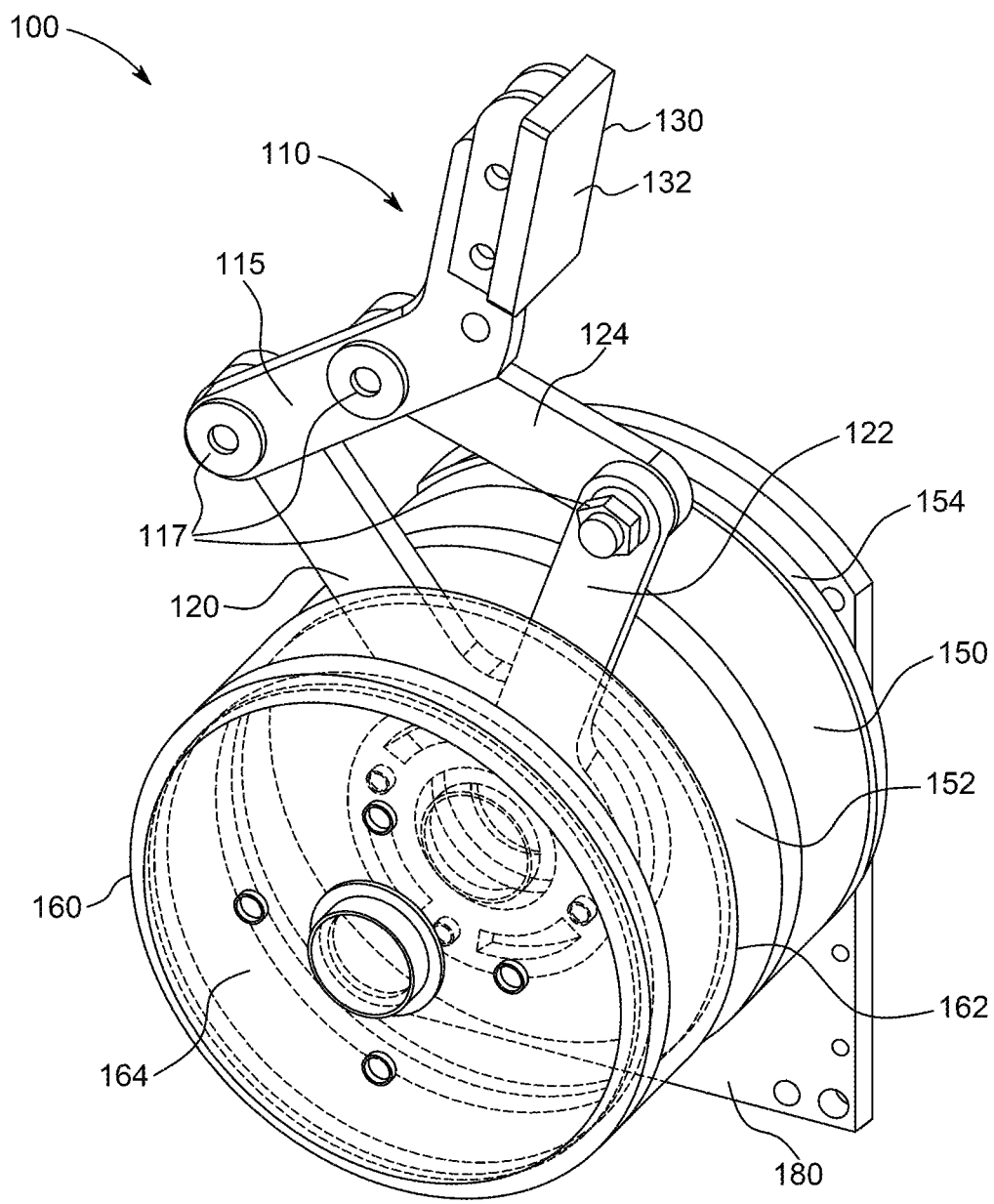
FIG. 1 is an isometric perspective of a robotic gripper with one movable finger device according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. The computing device may also be a desktop computer or other form of non-mobile computer. An "interface" refers to a generated display, such as one or more graphical user interfaces (GUIs) with which a user may interact, either directly or indirectly (e.g., through a keyboard, mouse, touchscreen, etc.).

Reference to "a computing device" or "a processor," as used herein, may refer to a previously-recited computing device and/or processor that is recited as performing a previous step or function, a different computing device and/or processor, and/or a combination of computing devices and/or processors. For example, as used in the specification and the claims, a first computing device and/or a first processor that is recited as performing a first step or function may refer to the same or different computing device and/or a processor recited as performing a second step or function.

All numbers used in the specification and claims are to be understood as being modified in all instances by the term "about". The terms "approximately", "about", and "substantially" mean a range of plus or minus ten percent of the stated value.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

In non-limiting embodiments, a gripper is provided with direct drive actuation. The use of direct-drive actuation for a robotic gripper allows for several advantages over robotic grippers of the prior art. This includes increased transparency, force bandwidth, speed, and mechanical simplicity. As used herein, the term "direct drive" means that the movable components of the gripper (e.g. individual links of the linkage arrangements described herein) connected to the motor are driven at the same angular velocity as the rotor of the motor. That is, if the rotor rotates at a first angular velocity, a link connected to the rotor also rotates at the first angular velocity. For example, in a direct drive configuration, the link may be connected to the motor without an intervening component (such as a gearbox) that alters the angular velocity of the rotor prior to connection to the link. In some non-limiting embodiments, a mechanical component such as a clutch may be provided between the motor and the link in order to allow the link to slip relative to the rotor. Such a clutch arrangement is still considered to be within the scope of a "direct drive" configuration because when the clutch is not slipping, the link connected to the motor is driven at the same angular velocity as the rotor.

"Transparency", as used herein, is defined as the bidirectional transmission of information carried by force and velocity signals between a controller and a robotic gripper. As the robotic gripper impacts an object, a system with higher transparency will result in decreased energy loss due to deceleration of the motor. There is also a decreased amount of force applied by the gripper to the impacted object, resulting in a lighter touch to the object.

Relatively high gear ratios for robotic manipulators result in relatively high reflected inertias. Relatively lower gear ratios (including a gear ratio of 1:1 provided by a direct drive configuration) result in relatively lower reflected inertia. A lower reflected inertia finger of the robotic gripper allows for higher bandwidth force, higher velocity gripper actuation, and/or greater position control. Lower reflected inertia also results in a higher input bandwidth. The transfer function from motor torque to load acceleration (assuming zero load torque) is identical to the transfer function from the load torque to motor acceleration (assuming no applied motor torque) and is given by Equation 1:

$$\frac{\ddot{\theta}_l}{\tau_m} = \frac{\ddot{\theta}_m}{\tau_l} = \frac{\eta N k}{(J_m N^2 + J_g)J_l s^2 + k(J_m N^2 + J_g + J_l)} \quad \text{Equation 1}$$

With lower reflected inertia, movable components of the gripper can accelerate and decelerate faster, allowing for higher bandwidth force, greater velocity, and/or greater position control. "Bandwidth force" as used herein, is defined as how quickly a motion can be completed in reaction to external disturbances (e.g., speed in which a force can be sensed and served). This system is similar to a mass-spring system $m_e \ddot{x} + k_e x = F$ with effective mass $m_e = (J_m N^2 + J_g)J_l$ and effective stiffness $k_e = k(J_m N^2 + J_g + J_l)$. The transfer function for this system is given by $1/(m_e s^2 + k_e)$. The natural open-loop frequency $\omega$ is given by Equation 2:

$$\omega = \frac{1}{2\pi}\sqrt{\frac{k_e}{m_e}}$$ Equation 2

$$= \frac{1}{2\pi}\sqrt{\frac{k(J_m N^2 + J_g + J_l)}{(J_m N^2 + J_g)J_l}}$$

$$= \frac{1}{2\pi}\sqrt{k\left(\frac{1}{J_m N^2 + J_g} + \frac{1}{J_l}\right)}$$

The natural open-loop frequency is proportional to $\sqrt{k}$, where k is the spring stiffness. The higher the stiffness, the higher the bandwidth. The bandwidth can also be increased by reducing the reflected and gearbox inertias ($J_m N^2 + J_g$).

The use of direct drive actuation may also result in higher speeds. As the gear ratio moves toward unity (i.e., a gear ratio of 1:1), higher speed ranges can be achieved. Even if the motors are designed to work at a fixed speed, a direct-drive architecture allows the components of the robotic gripper to move much faster than in a geared setting. Higher bandwidth and higher top speed means that the robotic gripper can more quickly change the applied torque of the motor.

In non-limiting embodiments or aspects, the present disclosure allows for a robotic gripper to have increased mechanical simplicity due to not requiring any gear boxes or springs. This allows for increased mechanical simplicity over the prior art. By not having gearboxes or springs, the robotic gripper has less mass. Gearboxes and springs also involve multiple moving parts that can wear, deform, and/or break. A robotic gripper without gearboxes or springs will reduce the number of possible points of failure for the robotic gripper and simplifies the design. Gearboxes also take up a considerable amount of space, so removal of the gearboxes also opens up more space and increases overall power per unit volume or mass of the overall robotic device. The additional space may allow the robotic gripper to have more motors and/or larger motors for each finger. Overall, a robotic gripper without gearboxes or springs will result in a more simplified design and reduced inefficiencies of the robotic gripper.

A model for an actuator and transmission is represented by the following equations of motion for the system:

$$(N^2 J_m + J_g)\ddot{\theta}_g + k(\theta_g - \theta_l) = \eta N \tau_m$$ Equation 3

$$J_l \ddot{\theta}_l + k(\theta_l - \theta_g) = \tau_l$$ Equation 4

In Equations 3 and 4, $J_m$, $J_g$, and $J_l$ correspond to the motor, gearing, and linkage, respectively, of the gripper, as will be described herein with reference to FIGS. 1-3. The gear ratio N as an efficiency η and a spring stiffness k, which represents either the series-elastic element or the strain gauge. The coordinates $\theta_m$, $\theta_g$, and $\theta_l$ represent the angular motion of the output of the motor, gearbox, and linkage, respectively. $\ddot{\theta}_g$ and $\ddot{\theta}_l$ represent the acceleration, or double derivative, of $\theta_g$, and $\theta_l$ respectively. Fine details which have negligible effect of the performance of the gripper, such as the gear backlash, are not included in Equations 3 and 4 to avoid unnecessary complexity.

The term ($N^2 J_m + J_g$) in Equation 3 indicates that the reflected inertia of the motor's rotor inertia after the gearbox is scaled by $N^2$. Even if the inertia of the motor's rotor is small, with a high gear ratio, the reflected inertia tends to be quite large. On the other hand, with a low gear ratio, a larger motor may be required to achieve the desired force output, making the rotor inertia itself larger.

For a fixed motor, adding a gear ratio increases the torque by N but the inertia by $N^2$. To get the same increase in torque by instead increasing the size of the motor, the inertia increases by a factor between N and $N^2$ depending on what other parameters are held constant.

The use of direct-drive actuation allows for the robotic gripper to use more reactive interactions with the environment instead of imposing forces unilaterally. Grippers of the prior art generally include stiff programing such that the gripper is moved to a particular location regardless of forces encountered on the path to the location. The present disclosure allows for a reactive response to encountered forces such that movement of the components of the gripper can be changed based on the forces encountered by the components. This is beneficial in areas where the shape of an object that is to be gripped, or the overall environment of the object, is not known or predictable.

Figure 2:
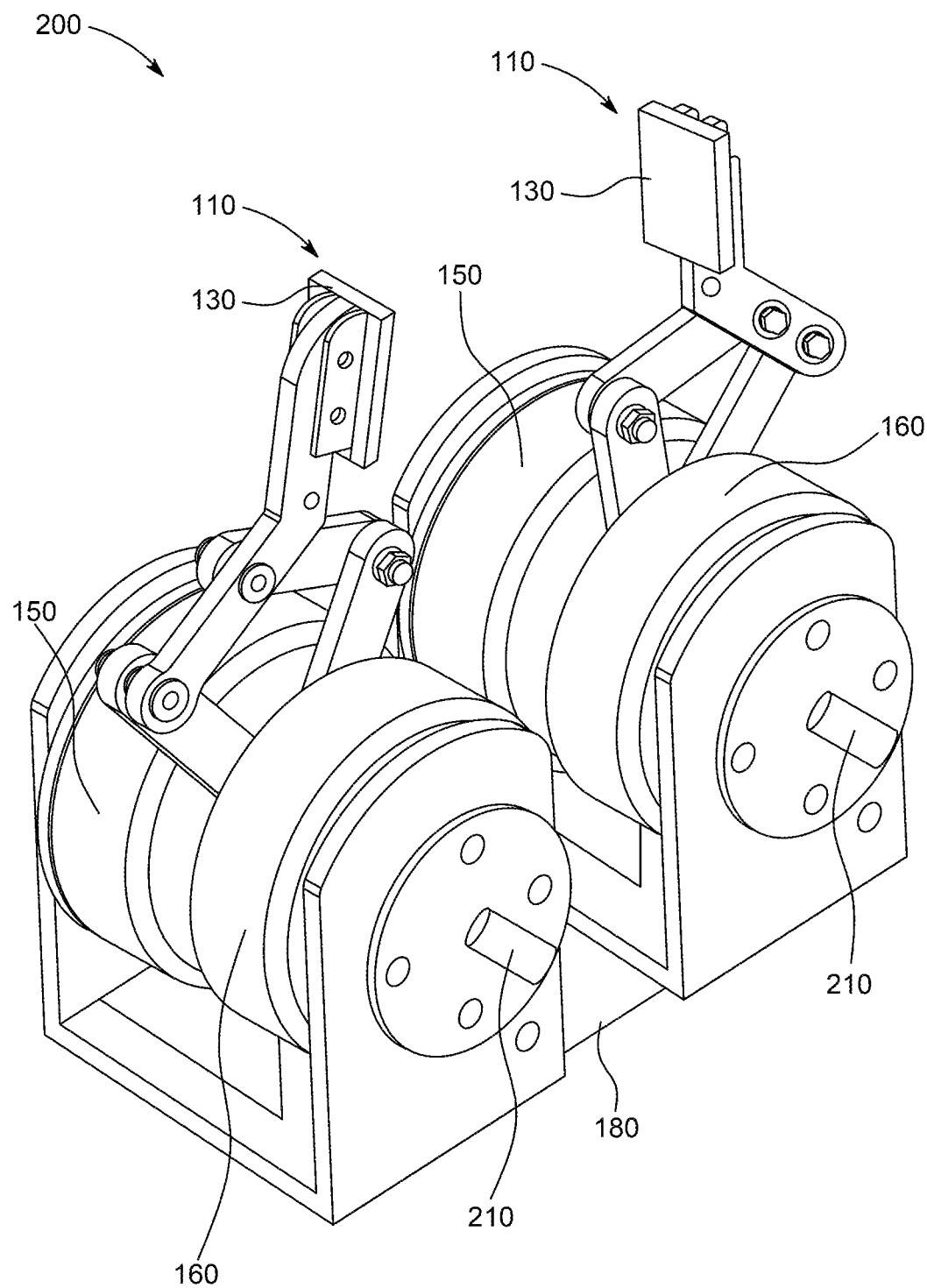
FIG. 2 is an isometric perspective of a robotic gripper with a two movable finger device according to a non-limiting embodiment.
Figure 3:
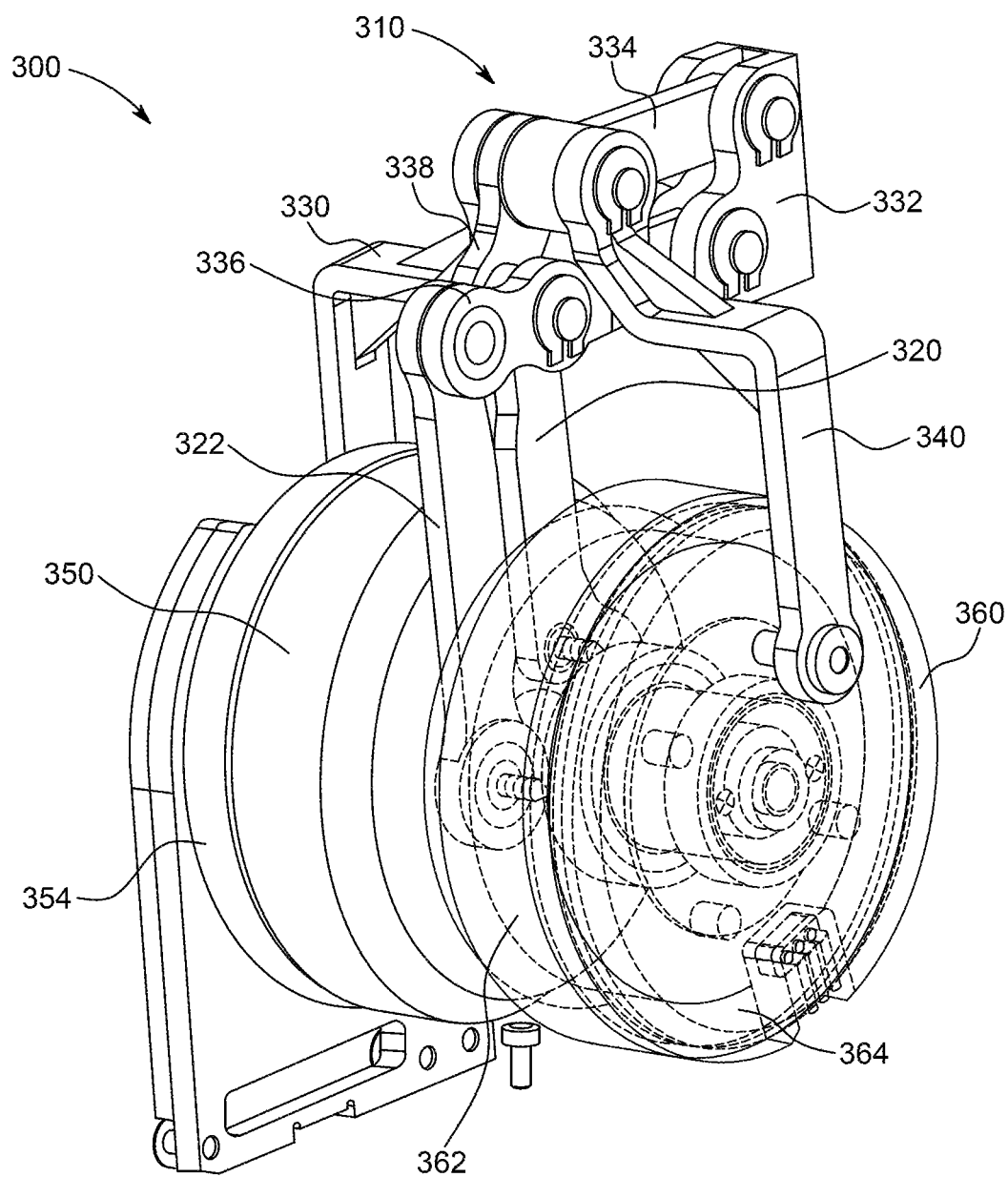
FIG. 3 is an isometric perspective of a robotic gripper with a two movable finger device according to a non-limiting embodiment.

Referring now to FIGS. 1-3, non-limiting embodiments or aspects of the present disclosure are directed to grippers 100, 200, 300 having at least one movable finger. Each movable finger includes at least one motor, a plurality of interconnected links connected to the at least one motor, and a gripper pad connected to the plurality of interconnected links. The gripper 100, 200, 300 may further include an actuator configured to move the at least one movable finger in one or more directions through space. In the non-limiting embodiments or aspects shown in FIGS. 1-3, each of the movable fingers associated with the grippers 100, 200, 300 includes two motors connected to various linkages of the movable finger to articulate the movable finger. Other non-limiting embodiments or aspects of the grippers 100, 200, 300 may include a single motor associated with each movable finger, or more than two motors associated with each movable finger. The number of motors associated with each movable finger may be proportional to how many active degrees of freedom the movable finger has. In the non-limiting embodiments or aspects shown in FIG. 1-3 each movable finger has two active degrees of freedom. In non-limiting embodiments or aspects with a single motor associated with each movable finger, the movable finger may have one active degree of freedom.

Referring now to FIG. 1, in some non-limiting embodiments or aspects, an isometric view of a gripper 100 is shown with one movable finger 110. The gripper 100 may include more than one movable finger 110, for example, two movable fingers 110, three movable fingers 110, or four movable fingers 110. Each movable finger 110 may include a gripper pad 130 and one or more links. Each movable finger 110 may be attached to at least two motors, a first motor 150 and a second motor 160. The first motor 150 may include a stator 152 and a rotor 154. The second motor 160 may also include a stator 162 and a rotor 164. In some non-limiting embodiments or aspects, the motors 150, 160 may be wound for high voltage and low current applications and may be brushless DC motors, such as gimbal motors. The use of two motors 150, 160 may allow for the movable finger 110 to apply twice as much force as can be achieved with one finger and also allows for a decreased torque requirement for the motors. Additionally, the use of two motors 150, 160 increased the movement capabilities of the movable finger 110.

With continued reference to FIG. 1, in some non-limiting embodiments or aspects, the motors 150, 160 may be located at the base of the finger. Placement of the motors at the base of the movable finger 110 allows for low linkage inertia and ensures that the finger can be accelerated or decelerated quickly.

With continued reference to FIG. 1, in some non-limiting embodiments the gripper pad 130 may be attached to the motors through at least one link. In some non-limiting embodiments, a link may be rigid and may be a bar with two ends. The bar may be flat, circular, rectangular, straight, bent, curved, and/or the like. The link may include a first end and a second end, wherein the second end is opposite the first end.

With continued reference to FIG. 1, in some non-limiting embodiments or aspects, the gripper pad 130 may be attached to a finger link 115. The gripper pad 130 may be attached to one end of the finger link 115. The gripper pad 130 may be made of a plastic, rubber, metal, and/or some combination thereof. The gripper pad 130 may be attached to the finger link 115 through at least one connector, such as a bolt, a screw, adhesive, weld, and/or the like. The gripper pad 130 may have a gripping surface 132. The gripping surface 132 may come in contact with an object (as shown in FIGS. 5A-5G) when the robotic gripper 100 is grabbing the object. The gripping surface 132 may be rectangular, circular, and/or the like in shape. The gripping surface 132 may include a textured surface or a material that increases the ability of the gripper 100 to grip an object (e.g., a texture or material with a higher coefficient of friction than the finger link 115 or a smooth gripping surface 132).

With continued reference to FIG. 1, in some non-limiting embodiments or aspects, the finger link 115 may include at least one connection point 117 for each motor connected to the movable finger 110. The connection point 117 may allow the finger link 115 to move pivotally around the connection point 117. The connection point 117 of the finger link 115 associated with the first motor 150 may be pivotally connected to a first motor link 120. The finger link 115 may be connected directly to the first motor link 120, such as by a bolt, screw, pin, rivet, and/or other connection device, or may be connected indirectly to the first motor link 120, such as by additional links. In some non-limiting embodiments, the connection point 117 associated with the first motor 150 may be on the opposite end of the finger link 115 compared to the gripper pad 130. In some non-limiting embodiments, the connection point 117 of the finger link 115 associated with the second motor 160 may be located between the connection point 117 associated with the first motor 150 and the gripper pad 130. The connection point 117 associated with the second motor 160 may be pivotally connected to a second motor link 122 or another link, such as a connecting link 124. The connecting link 124 may be a link that connects two other links together. It may have a connection point 117 on each end such that each connection point connects the connecting link 124 to a different link. Each connection point 117 of the connecting link 124 may be a pivotal connection point. One end of the connecting link 124 may be connected to one end of the finger link 115 and other end of the connecting link 124 may be connected to one end of the second motor link 122. The connection point 117 may utilize a means of connection, such as a bolt, nail, pin, rivet, and/or the like to connect a link to another link or motor.

In some non-limiting embodiments, the connection point 117 associated with the second motor 160 may be located on the opposite end of the finger link 115 and the connection point 117 associated with the first motor 150 may be located between the connection point 117 associated with the second motor 160 and the gripper pad 130.

With continued reference to FIG. 1, in some non-limiting embodiments or aspects, one end of the first motor link 120 may be coupled to the first motor 150, either directly by a connector (e.g., bolt, nail, pin, rivet, and/or the like) or indirectly. One end of the second motor link 122 may be coupled to the second motor 160, either directly by a connector (e.g., bolt, nail, pin, rivet, and/or the like) or indirectly. In some non-limiting embodiments or aspects, the first motor link 120 may be coupled to the rotor of the first motor 152 and the second motor link 122 may be coupled to the rotor of the second motor 162.

In some non-limiting embodiments or aspects, when the first motor 150 rotates at a first angular velocity, the first motor link 120 is coupled to the first motor 150 such that the coupled end of the first motor link 120 rotates in the same angular velocity. In some non-limiting embodiments or aspects, when the second motor 160 rotates at an angular velocity, the second motor link 122 is coupled to the second motor 160 such that the coupled end of the second motor link 122 rotates in the same angular velocity.

In some non-limiting embodiments, each finger may utilize a total of five links that are connected to each other and the motors 150, 160. In other non-limiting embodiments, each finger may utilize less than five links (e.g., four links or less) or more than five links (e.g., six links or more).

In some non-limiting embodiments, at least one of the motors 150, 160 may be connected to a support plate 180. The support plate 180 may be connected to at least one of the stators 154, 164 of the respective motors 150, 160.

Referring now to FIG. 2, in some non-limiting embodiments or aspects, shown is a gripper 200 utilizing two movable fingers 110. The movable fingers 110 may be arranged parallel to each other such that the gripper pads 130 of each movable finger 110 face each other. The two movable fingers 110 may be located in the same plane such that both movable fingers 110 move within the same plane of motion. In other non-limiting embodiments, the movable fingers 110 may be oriented so as to move in different planes. In some non-limiting embodiments, the two movable fingers 110 may be oriented such that they move in planes perpendicular to one another, or in planes at angle between 0° and 180° relative to one another. The actuation of the first motor 150 and/or second motor 160 of each of the movable fingers may drive the gripper pads 130 of the two movable fingers toward one another. One or more motors may include an on-axis magnetic encoder 210. The magnetic encoder 210 may communicate absolute position sensing of the motor to a controller (see FIG. 6) and may utilize a diametrically polarized magnet to determine the absolute position.

In some non-limiting embodiments or aspects, the movable fingers 110 may be configured to grip and large or small object through a parallel grasp. In some non-limiting embodiments or aspects, the angle of the gripper pads 130 may be altered through actuation of the motors in order to enable pinch grasps.

In some non-limiting embodiments or aspects, three or more movable fingers 110 may be arranged in a circular arrangement such that the gripper pads 130 may face a common point in space. In some non-limiting embodiments or aspects, the movable fingers 110 may be located at different elevations and/or orientations.

Referring now to FIG. 3, shown is a non-limiting embodiment of a gripper 300 utilizing a movable finger 310 with a first motor 350 and a second motor 360. The non-limiting embodiment of the movable finger 310 utilizes eight links. The gripper 300 in FIG. 3 includes a first mounting link 330 and a second mounting link 340. One end of the first mounting link 330 may be coupled (e.g., pivotally connected) to a mounting point. In some non-limiting embodiments or aspects, the mounting point for the first mounting link 330 may be on the stator of the first motor 350. One end of the second mounting link 340 may be coupled (e.g., pivotally connected) to another mounting point. In some non-limiting embodiments or aspects, the mounting point for the second mounting link 340 may be on the stator of the second motor 360.

With continued reference to FIG. 3, in some non-limiting embodiments or aspects, the second end of the first mounting link 330 and the second mounting link 340 may be pivotally connected to another link. In some non-limiting embodiments or aspects, the first mounting link 330 and the second mounting link 340 may be connected to the same link. In some non-limiting embodiments or aspects, the first mounting link 330 and the second mounting link 340 may be pivotally connected to one end of a top gripper pad link 334. The other end of the top gripper pad link 334 may be pivotally connected to one end of a gripper pad 332.

With continued reference to FIG. 3, in some non-limiting embodiments or aspects, another end of the gripper pad 332 may be pivotally connected to a bottom gripper pad link 336. The bottom gripper pad link 336 may also be pivotally connected to a first motor link 320 and/or a second motor link 322. The connection point for the second motor link 322 on the bottom gripper pad link 336 may be located between the connection point of the first motor link 320 and the connection point of the gripper pad 332, or the connection point for the first motor link 320 on the bottom gripper pad link 336 may be located between the connection point of the second motor link 322 and the connection point of the gripper pad 332.

With continued reference to FIG. 3, in some non-limiting embodiments or aspects, another end of the first motor link 320 may be coupled to the first motor 350 (e.g., pivotally connected to the rotor of the first motor 350). In some non-limiting embodiments or aspects, another end of the second motor link 322 may be coupled to the second motor 360 (e.g., pivotally connected to the rotor of the second motor 360).

With continued reference to FIG. 3, in some non-limiting embodiments or aspects, the top gripper pad link 334 may be connected to the bottom gripper pad link 336 through a connector link 338. One end of the connector link 338 may be pivotally connected to the top gripper pad link 334. The connection point between the connector link 338 and the top gripper pad link 334 may be at the same connection point as the connection between the top gripper pad link 334 and the first mounting link 330 and/or second mounting link 340. Another end of the connector link 338 may be pivotally connected to the bottom gripper pad link 336. The connection point between the connector link 338 and the bottom gripper pad link 336 may be the same connection point as the connection point between the bottom gripper pad link 336 and the first motor link 320 or the second motor link 322.

Figure 4:
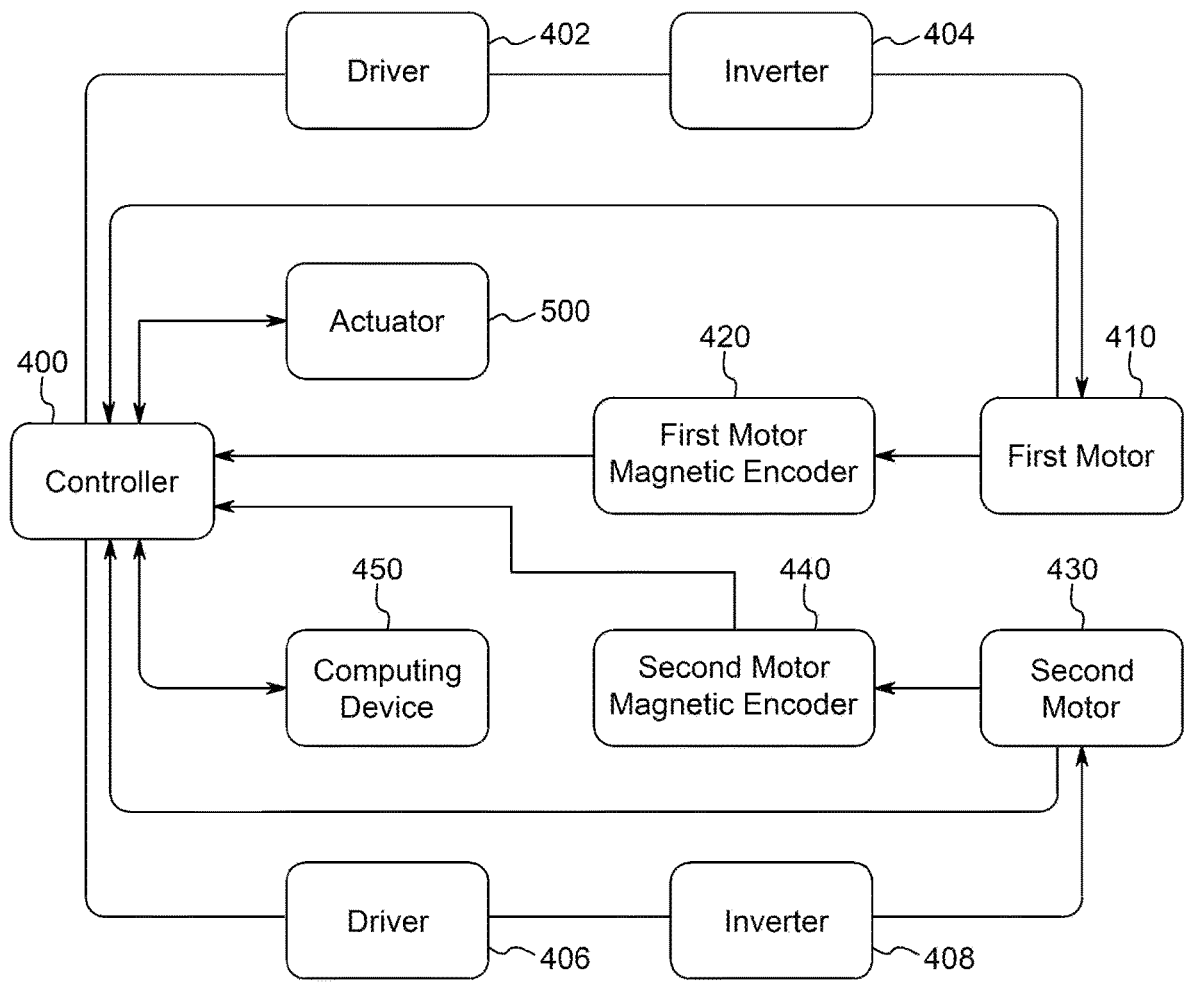
FIG. 4 is a schematic diagram of a system of controlling a robotic gripper according to a non-limiting embodiment.

Referring now to FIG. 4, in some non-limiting embodiments or aspects, each gripper 100, 200, 300 and an associate actuator 500 (e.g., a robotic arm to which the gripper 100, 200, 300 is mounted) may be controlled by a controller 400. The controller 400 may be programmed or configured to actuate a first motor 410 and second motor 430 of each movable finger. The controller 400 may communicate with one or more of the motors 410, 430 of the finger to control the movement of the motors. The controller 400 may utilize one or more motor drivers 402, 406 to communicate with and control the respective motors 410, 430. In non-limiting embodiments, each of the motor drivers 402, 406 may include a MOSFET, a JFET, or a similar device to effect control of the associated motors 410, 430. The motor driver 402, 406 may be in communication with respective inverters 404, 408 configured to supply voltage in the appropriate form to power the motors 410, 430. In non-limiting embodiments, each of the inverters 404, 408 may convert DC voltage from the drivers 402, 406 to 3-phase AC voltage to power the motors 410, 430. The motors 410, 430 may communicate with the controller 400 to provide position, current, or other sensor feedback. The one or more motors 410, 430 may include an on-axis magnetic encoder 420, 440. The magnetic encoders 420, 440 may communicate absolute position sensing of the motors 410, 430 to the controller 400 and may utilize a diametrically polarized magnet to determine the absolute position. The communications may be completed via a Controller Area Network bus, or the control electronics may be integrated into the chassis of the robotic gripper. More than one (e.g., two, three, five, etc.) fingers may be supported by the same controller 400. In some non-limiting embodiments or aspects, more than one controller 400 may be used to control fingers of the same robotic gripper 100, 200, 300.

With continued reference to FIG. 4, in some non-limiting embodiments or aspects, the controller 400 may use a proportional-derivative scheme for position control of each motor 410, 430. A Field Oriented Control (FOC) loop may be used to track current in the motors 410, 430 and may use position feedback from the encoders 420, 440. The controller 400 may take the filtered encoder position and velocity as feedback. The controller 400 may communicate with a computing device 450. The computing device 450 may be programmed or configured to interpolate data communicated from the controller 400 or directly from the encoders 420, 440 to track the trajectory of the fingers. The computing device 450 may be programmed or configured to communicate instructions to the controller 400 to control the motors 410, 430 based on the trajectory. In some non-limiting aspects or embodiments, the computing device 450 may be a component of the controller 400, as described herein in connection with FIG. 6.

Figure 5B:
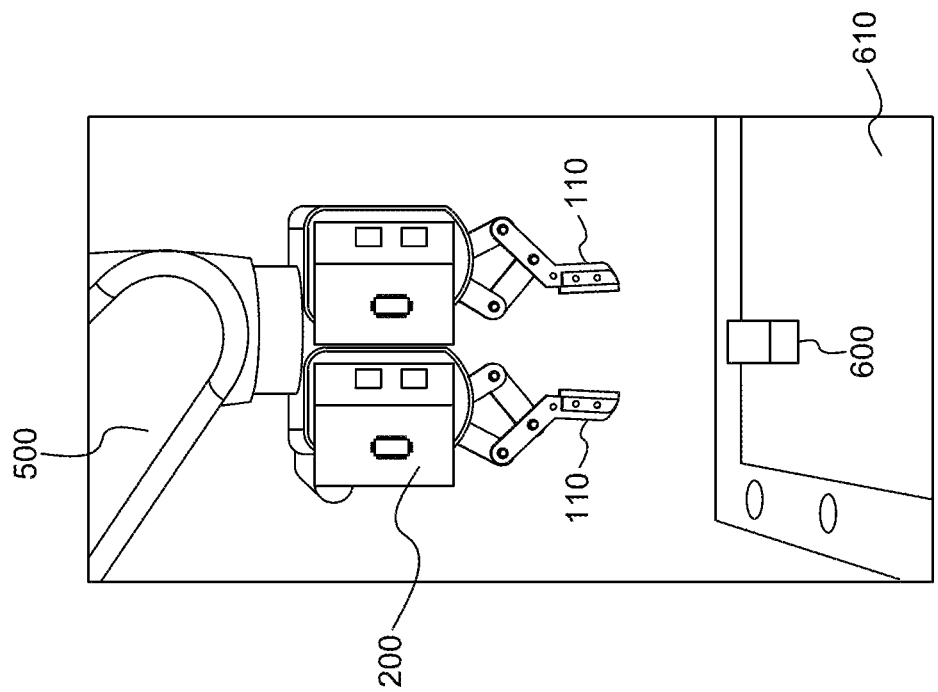
FIGS. 5A, 5B, 5C, 5D, 5E, 5F, and 5G show a robotic gripper at stages of a smack and snatch operation.
Figure 5A:
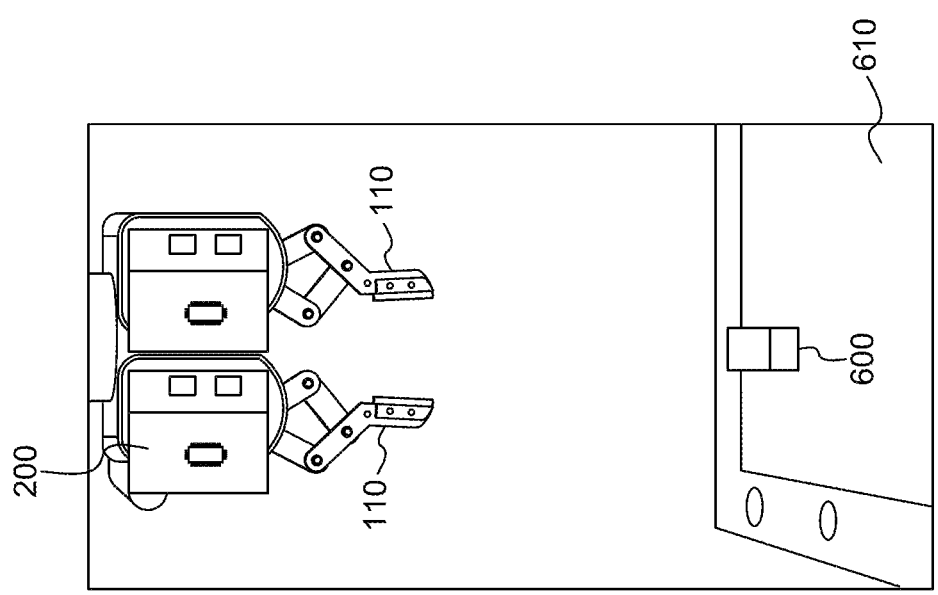

Referring now to FIGS. 5A-5G, in some non-limiting embodiments or aspects, shown is a sequence of operations of the robotic gripper 200 to complete a "smack and snatch" operation on an object 600. Although FIGS. 5A-5G generally show a robotic device including the embodiment of the gripper 200 described herein with reference to FIG. 2, it is to be understood that the depicted robotic device could also perform the "smack and snatch" operation with the embodiments of the gripper 100, 300 described herein in connection with FIGS. 1 and 3. In this operation, the actuator 500 (e.g., a robotic arm) moves the gripper 200. The robotic arm 500 may be controlled by the controller 400, as described herein in connection with FIG. 4. The gripper 200 includes at least one movable finger 110 as described herein, and may include two movable fingers 110. Each movable finger 110 includes two motors and interconnected links with a gripper pad connected to at least one of the links (e.g., the interconnected link arrangements shown in FIGS. 1-3). The robotic arm 500 is programmed or configured to move the gripper 200 in three dimensions, including moving the gripper 200 towards a surface 610 in which an object 600 is placed upon (as shown in FIG. 5B).

Figure 5D:
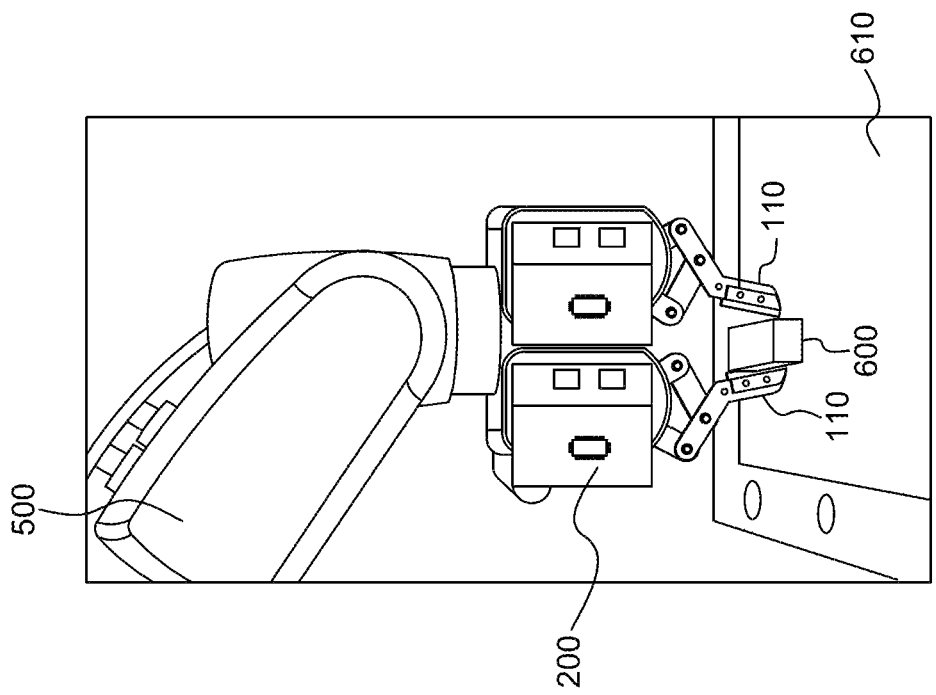
Figure 5C:
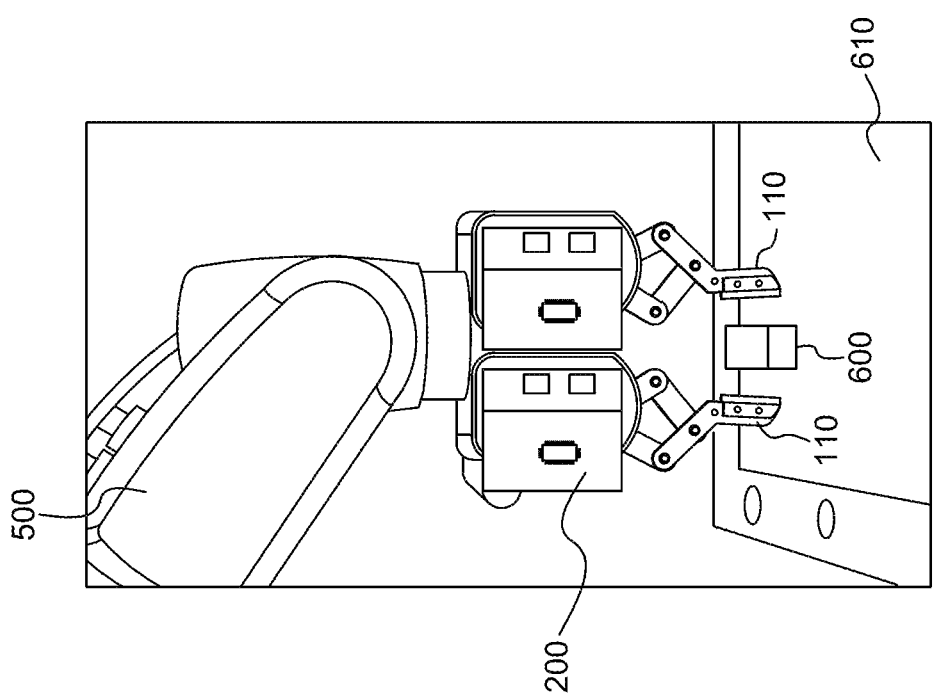
Figure 5F:
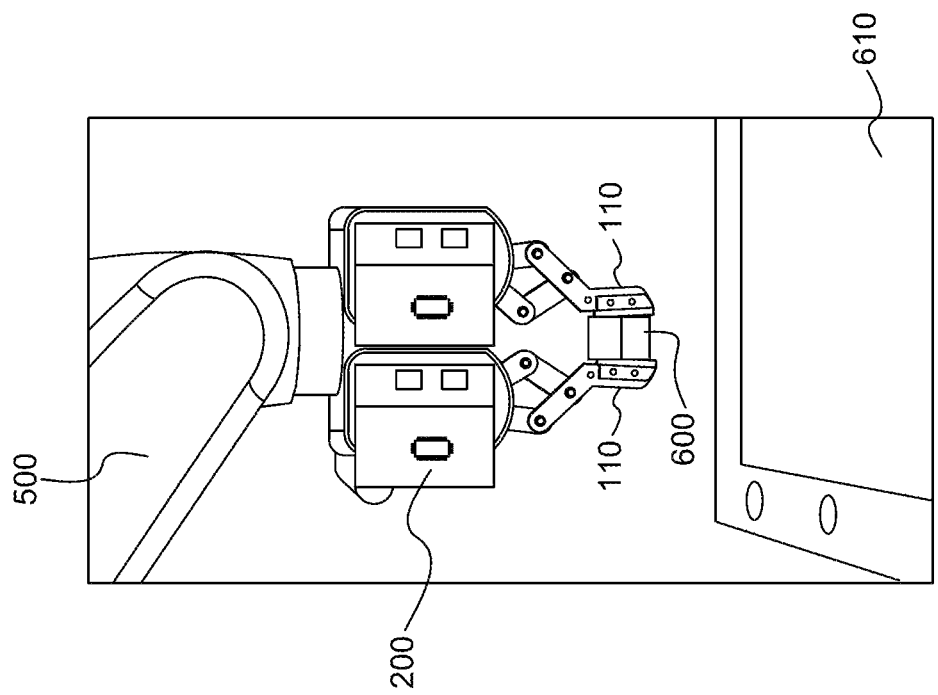

Referring to FIG. 5C, in some non-limiting embodiments or aspects, the controller 400 is programed or configured to stop the actuator 500 from moving toward a surface 610 of the table when at least one or more than one movable finger 110 comes in contact with the surface of the table. When a finger 110 comes in contact with the surface 610, this may cause at least one of the links attached to the gripper 200 to pivotally rotate. The movement of the link may then cause rotation of at least one motor rotor (e.g., back drive the rotor). Rotation (e.g., angular displacement) of the rotor of at least one of the motors 150, 160 may be detected by the encoder 210 associated with the rotor. The encoder 210 may then communicate the rotation to the controller 400. Upon receiving the communication from the encoder 210, the controller 400 may determine that the finger 110 has come in contact with the surface 610. The controller 400 may then communicate instructions to the robotic arm 500 to stop movement toward the surface 610. Detecting the angular displacement of the rotor after impact with the surface 610 may simulate the springs used for motor control in conventional grippers.

Referring to FIG. 5D, in some non-limiting embodiments or aspects, the controller 400 may communicate to the motors 150, 160 of the movable fingers 110 to actuate the motors 150, 160 in order to move the fingers 110 in a direction toward the object 600 on the surface 610. The rotors 152, 162 of the motors 150, 160 of the movable fingers 110 may rotate in a direction based on the instructions from the controller 400. Two fingers 110 may move toward each other on either side of the object 600. When at least one finger 110 comes in contact with the object 600, a force is applied to the gripper 130 of the finger 110 from the object 600. The force on gripper 130 is transferred to the rotor 152, 162 through the links 115, 120, 122, 124. The force causes a change in the rotation or rate of rotation of the rotor 152, 162 that is detected by the encoder 210. The encoder 210 then communicates the change to the controller 400. When the controller 400 determines that the movable fingers 110 have met a threshold amount of gripping pressure on the object 600, the controller 400 will communicate instructions to the motors 150, 160 to maintain a driving current on the first motor 150 and/or second motor 160 to retain a grip on the object 600 by at least one movable finger 110. The threshold amount of gripping pressure may be predetermined. The gripping pressure may be determined by the controller 400 by the load on at least one motor 150, 160 associated with the movable finger 110.

Figure 5E:
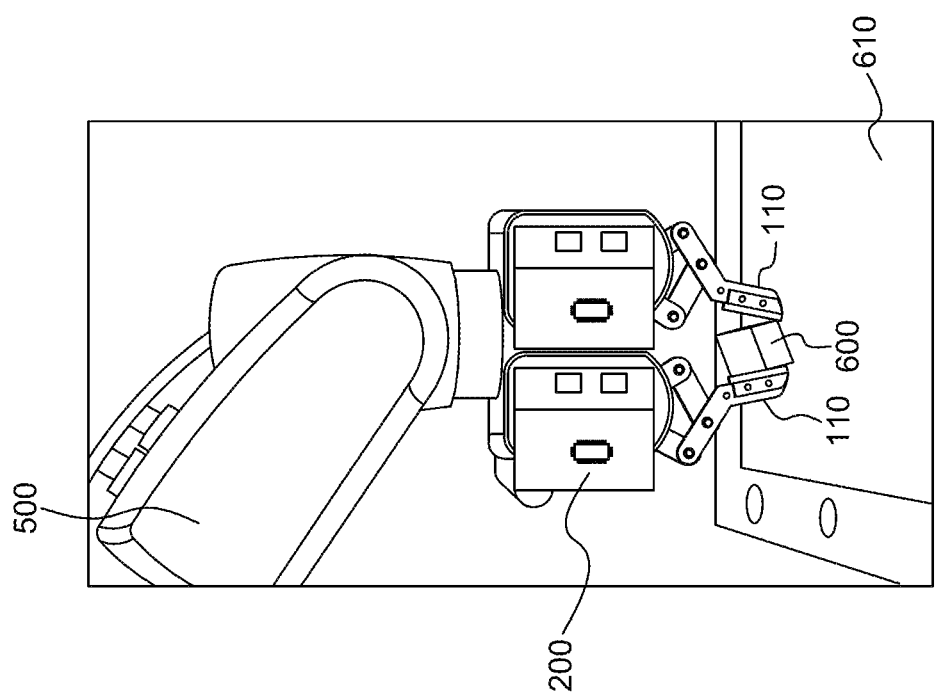
Figure 5G:
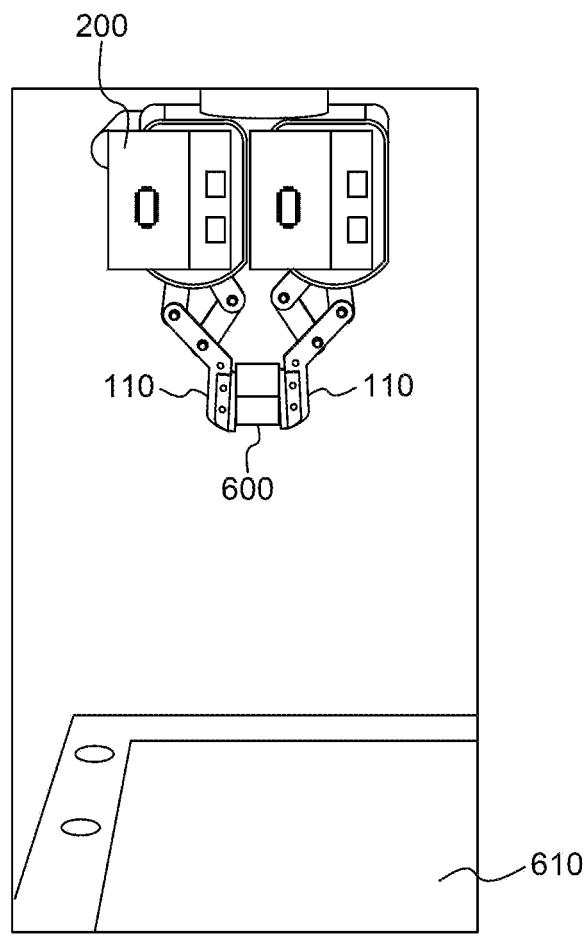

Referring to FIG. 5E, in some non-limiting embodiments or aspects, once a grip on the object 600 is maintained, the controller 400 may communicate to the actuator 500 to lift and/or move the object 600 that is gripped by the movable finger 110. The controller 400 may direct the actuator 500 to move the object 600 to a predetermined location. Referring to FIG. 5G, once the object 600 is moved to the predetermined location, the controller 400 may communicate instructions to the actuator 500 to stop movement of the gripper 200 and may communicate instructions to the motors 150, 160 to maintain the driving current to maintain the grip.

In some non-limiting embodiments or aspects, the controller 400 may be programmed or configured to determine a winding temperature of at least one of the motors 150, 160 associated with a movable finger 110. Managing the temperature of the motor 150, 160 may allow the motor 150, 160 to be operated over the motor's nominal operating limits. This may help mitigate the loss of torque that may be experienced by the gripper 100, 200, 300 due to the removal of the gearbox. The controller 400 may ensure that the motor winding does not exceed a predetermined threshold temperature. If a motor winding exceeds the predetermined threshold temperature, or the controller 400 determines that the motor winding temperature will exceed the threshold temperature if the current trajectory remains, then the controller 400 can initiate active or passive cooling (e.g., blowing air over the motors). The controller 400 may also initiate breaks to reduce the temperature, such as by reducing the driving current of at least one motor 150, 160. This may result in the gripper 100, 200, 300 putting the object 600 down to allow the temperature of the motor 150, 160 to be reduced prior to the motor 150, 160 being damaged.

In some non-limiting embodiments or aspects, the loss of torque may be mitigated through the use of kinematic singularities. The finger linkages for the disclosed robotic gripper may be nonlinear, which may cause characteristics, such as compliance and force limits, to vary with the operating point. Therefore, the choice of hand pose or grasp configuration may vary the characteristics. For example, a particular hand pose could put the finger singularities or travel limits to provide high forces. Other hand poses may result in high compliance. Therefore, the controller may communicate instructions to actuate the motors in such a way to change the position of the links, resulting in a different orientation of the movable fingers.

In some non-limiting embodiments or aspects, the loss of torque also may be mitigated through the use of direction rigidity. The fingers of the robotic gripper may utilize an anisotropic stiffness. The robotic gripper may be rigid in one or more directions, but compliant in one or more other directions. For example, the fingers of the robotic gripper may have at least two degrees of freedom. Two degrees of freedom may be constrained to be planar such that the fingers may maintain rigidity in the out-of-plane directions. Rigidity in the out-of-plane directions may be maintained by pushing against the structure and bearings. This differs from traditional robotic grippers which are rigid in all directions. The use of rigidity in all directions results in rigid and heavy hands that reduces the required planning and control intelligence, but also reduces the variety of mechanical intelligence available. Intelligently planning grasp and transfer motions, as can be done with the disclosed robotic gripper, can achieve lower peak gripping forces.

In some non-limiting embodiments or aspects, the gripper may include additional motors that may be actuated to control additional degrees of freedom of the movable fingers. Additional motors could be used, for example, to actuate the movable finger. In should be appreciated that additional motors could be added to any embodiment of the gripper 100, 200, 300 discussed herein, along with complementary changes to the linkage design, to facilitate control of the movable fingers in additional directions with additional (or fewer) degrees of freedom. For example, additional motors may be provided to allow the fingers to rotate about an axis.

Figure 6:
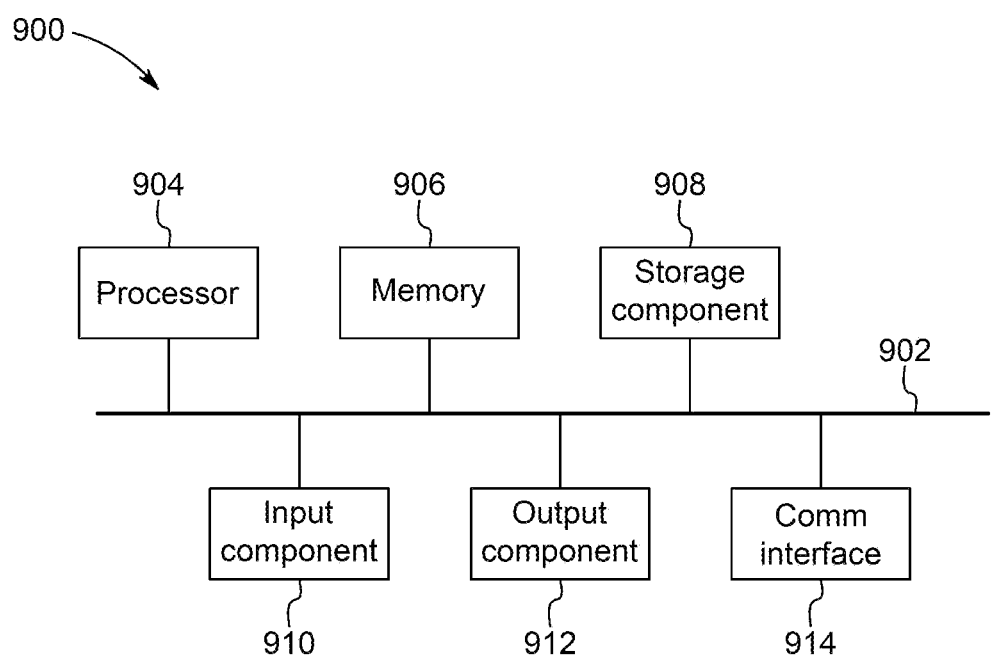
FIG. 6 is a schematic diagram of an electronic controller according to a non-limiting embodiment.

Referring now to FIG. 6, in some non-limiting embodiments or aspects, shown is a diagram of example components of a device 900. Device 900 may correspond to the controller 400, as an example. In some non-limiting embodiments, such systems or devices may include at least one device 900 and/or at least one component of device 900. The number and arrangement of components shown are provided as an example. In some non-limiting embodiments, the device 900 may include additional components, fewer components, different components, or differently arranged components than those shown in FIG. 6. Additionally, or alternatively, a set of components (e.g., one or more components) of the device 900 may perform one or more functions described as being performed by another set of components of device 900.

As shown in FIG. 6, device 900 may include a bus 902, a processor 904, memory 906, a storage component 908, an input component 910, an output component 912, and a communication interface 914. The bus 902 may include a component that permits communication among the components of the device 900. In some non-limiting embodiments, the processor 904 may be implemented in hardware, firmware, or a combination of hardware and software. For example, the processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, the storage component 908 may store information and/or software related to the operation and use of the device 900. For example, the storage component 908 may include a hard disk (e.g., a magnetic disk, an optical disk, a magneto-optic disk, a solid state disk, etc.) and/or another type of computer-readable medium. The input component 910 may include a component that permits the device 900 to receive information, such as via user input (e.g., a touch screen display, a keyboard, a keypad, a mouse, a button, a switch, a microphone, etc.). Additionally, or alternatively, the input component 910 may include a sensor for sensing information (e.g., a global positioning system (GPS) component, an accelerometer, a gyroscope, an actuator, etc.). The output component 912 may include a component that provides output information from the device 900 (e.g., a display, a speaker, one or more light-emitting diodes (LEDs), etc.). The communication interface 914 may include a transceiver-like component (e.g., a transceiver, a separate receiver and transmitter, etc.) that enables the device 900 to communicate with other devices, such as via a wired connection, a wireless connection, or a combination of wired and wireless connections. The communication interface 914 may permit the device 900 to receive information from another device and/or provide information to another device. For example, the communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 900 may perform one or more processes described herein. The device 900 may perform these processes based on the processor 904 executing software instructions stored by a computer-readable medium, such as the memory 906 and/or the storage component 908. A computer-readable medium may include any non-transitory memory device. A memory device includes memory space located inside of a single physical storage device or memory space spread across multiple physical storage devices. Software instructions may be read into the memory 906 and/or the storage component 908 from another computer-readable medium or from another device via the communication interface 914. When executed, software instructions stored in the memory 906 and/or storage component 908 may cause the processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 7:
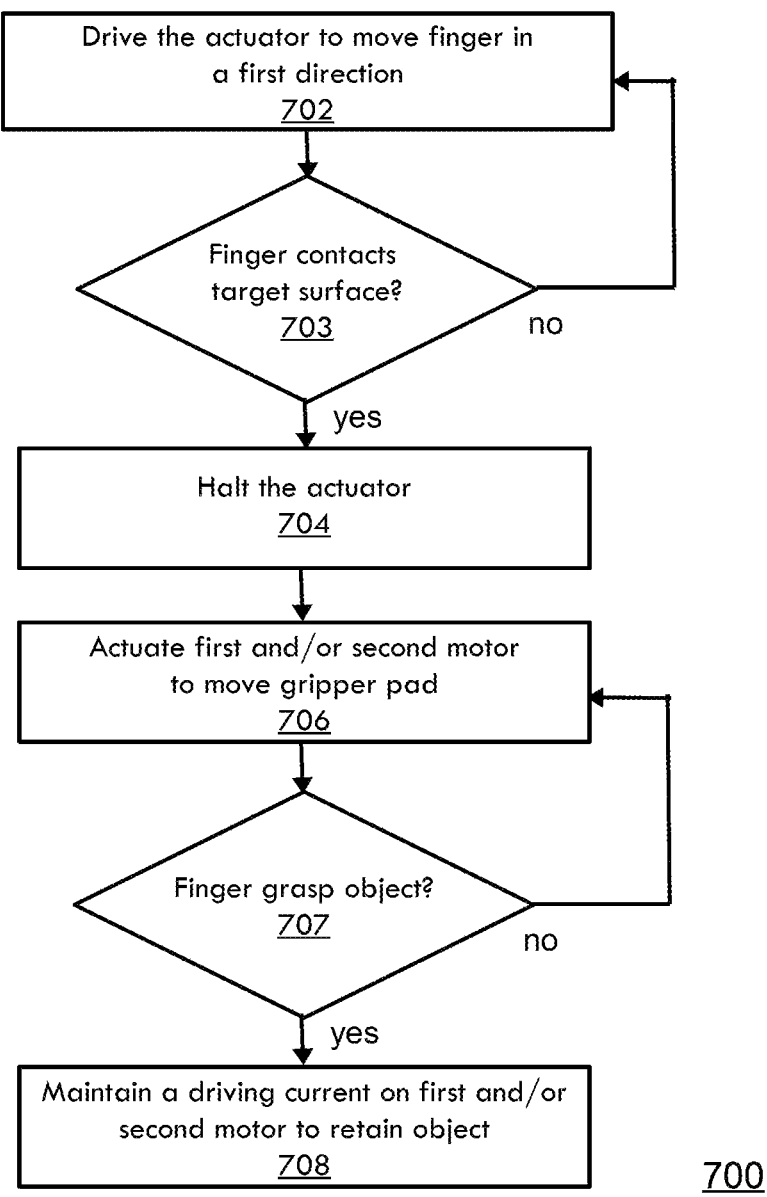
FIG. 7 is a step diagram of a method for grasping an object with a robotic gripper.

Referring now to FIG. 7, in some non-limiting embodiments or aspects, a sequence diagram of a method 700 of controlling a robotic device according to a non-limiting embodiment of the present disclosure is illustrated. The method 700 may include steps for performing a "smack and snatch" operation for grasping an object 600 substantially as described herein with reference to FIGS. 5A-5G. In non-limiting embodiments, any or all of steps 702-708 of the method 700 may be performed by the controller 400. It will be appreciated that, in non-limiting embodiments, additional, fewer, and/or different steps may be used.

With continued reference to FIG. 7, at step 702, the method 700 may include driving the actuator 500 to move the at least one movable finger 110, 310 in a first direction toward the target surface 610.

With continued reference to FIG. 7, at step 703, the method 700 may include determining that the at least one movable finger 110, 310 is in contact with the target surface 610 by detecting the target surface 610. Such a determination may be continually and/or periodically performed while driving the actuator 500 at step 702. In response to determining that the at least one movable finger is in contact with the target surface 610, the method may proceed to step 704, in which the actuator 500 is halted automatically. In non-limiting embodiments, determining that the at least one movable finger 110, 310 is in contact with the target surface 610 at step 703 may include detecting angular displacement of at least one motor of the gripper 110, 310 (e.g. at least one of the first motor 150, 350 and the second motor 160, 360), and/or detecting a load above a predetermined threshold on at least one of the first motor 150, 350 and the second motor 160, 360. Detecting angular displacement of the at least one motor may be performed by one or more of the encoders 420, 440.

With continued reference to FIG. 7, after the actuator 500 is halted at step 704, at step 706 the method 700 may include actuating the at least one motor (e.g. at least one of the first motor 150, 350 and the second motor 160, 360) to move the gripper pad 130, 332 toward the object 600 on the target surface 610.

With continued reference to FIG. 7, at step 707, the method 700 may include determining that the at least one movable finger 110, 310 has grasped the object 600 on the target surface 610. Such a determination may be continually and/or periodically performed while actuating the motor at step 706. In response to determining that the at least one movable finger 110, 310 has grasped the object 600 on the target surface 610, the method may proceed to step 708, in which a driving current is maintained on the at least one motor (e.g. at least one of the first motor 150, 350 and the second motor 160, 360) to retain the object 600 in the at least one movable finger 110, 310. In non-limiting embodiments, determining that the at least one movable finger 110, 310 has grasped the object 600 on the target surface 610 at step 707 may include detecting angular displacement of at least one motor of the finger 110, 310 (e.g. at least one of the first motor 150, 350 and the second motor 160, 360), and/or detecting a load above a predetermined threshold on at least one of the first motor 150, 350 and the second motor 160, 360.

In non-limiting embodiments, the method 700 may further include determining a winding temperature of at least one of the first motor 150, 350 and the second motor 160, 360. The winding temperature may be determined by an integrator or other component in operative communication with the controller 400. In non-limiting embodiments, the method 700 may further include releasing the object 600 held by the at least one movable finger 110, 310 in response to determining that the winding temperature exceeds a predetermined threshold. In non-limiting embodiments, the method 700 may further include predicting a change in the winding temperature of at least one of the first motor 150, 250 and the second motor 160, 360 based on a planned movement of the at least one movable finger 110, 310. In non-limiting embodiments, the method 700 may further include altering the planned movement to prevent the winding temperature from exceeding a predetermined threshold.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A gripper comprising:
   at least one movable finger, each movable finger comprising:
      a first motor;
      a second motor;
      a first motor link comprising a first end coupled to a rotor of the first motor;
      a second motor link comprising a first end coupled to a rotor of the second motor;
      a finger link comprising:
         a first end in pivotal connection with a second end of the second motor link; and
         a gripper pad; and
      a connecting link comprising:
         a first end in pivotal connection with a second end of the first motor link; and
         a second end in pivotal connection with the finger link; and
   at least one controller programmed or configured to: actuate the first motor and the second motor of each of the at least one movable finger; determine a winding temperature of at least one of the first motor and the second motor; and release an object held by the at least one movable finger in response to determining that the winding temperature exceeds a predetermined threshold.

2. The gripper of claim 1, wherein the at least one movable finger comprises two movable fingers facing toward one another such that actuation of the first motor and the second motor of the two movable fingers drives gripper pads of the two movable fingers toward one another.

3. The gripper of claim 1, wherein the first motor link is coupled to the first motor such that rotation of the first motor at a first angular velocity causes rotation of the first motor link at the first angular velocity, and
   wherein the second motor link is coupled to the second motor such that rotation of the second motor at a second angular velocity causes rotation of the second motor link at the second angular velocity.

4. The gripper of claim 1, further comprising an actuator configured to move the at least one movable finger in a first direction,
   wherein the at least one controller is further programmed or configured to:
      drive the actuator to move the at least one movable finger in the first direction toward a target surface;
      halt the actuator in response to determining that the at least one movable finger is in contact with the target surface;
      actuate the first motor and the second motor to move the gripper pad toward an object on the target surface; and
      in response to determining that the at least one movable finger has grasped the object on the target surface, maintain a driving current on the first motor and the second motor to retain the object in the at least one movable finger.

5. The gripper of claim 4, wherein determining that the at least one movable finger is in contact with the target surface comprises detecting angular displacement of at least one of the first motor and the second motor.

6. The gripper of claim 4, wherein determining that the at least one movable finger has grasped the object on the target surface comprises detecting a load above a predetermined threshold on at least one of the first motor and the second motor.

7. The gripper of claim 1, wherein the at least one controller is further programmed or configured to:
   predict a change in the winding temperature of at least one of the first motor and the second motor based on a planned movement of the at least one movable finger; and
   alter the planned movement to prevent the winding temperature from exceeding a predetermined threshold.

8. A gripper comprising:
   at least one movable finger, each movable finger comprising:
      at least one motor;
      a plurality of interconnected links connected to the at least one motor; and
      a gripper pad connected to the plurality of interconnected links;
   an actuator configured to move the at least one movable finger in a first direction; and
   a controller programmed or configured to:
      drive the actuator to move the at least one movable finger in the first direction toward a target surface;
      halt the actuator in response to determining that the at least one movable finger is in contact with the target surface;
      actuate the at least one motor of each of the at least one movable finger to move the gripper pad toward an object on the target surface;
      in response to determining that the at least one movable finger has grasped the object on the target surface, maintain a driving current on the at least one motor to retain the object in the at least one movable finger;
      determine a winding temperature of at least one of a first motor and a second motor of the at least one motor;
      predict a change in the winding temperature of at least one of the first motor and the second motor based on a planned movement of the at least one movable finger; and
      alter the planned movement to prevent the winding temperature from exceeding a predetermined threshold.

9. The gripper of claim 8, wherein the controller is further programmed or configured to release the object held by the at least one movable finger in response to determining that the winding temperature exceeds a predetermined threshold.

10. A method for controlling a gripper, the method comprising:
- driving an actuator to move at least one movable finger of the gripper in a first direction toward a target surface;
- determining, with at least one processor, that the at least one movable finger is in contact with the target surface;
- halting the actuator in response to determining that the at least one movable finger is in contact with the target surface;
- actuating at least one motor of each of the at least one movable finger to move a gripper pad of each of the at least one movable finger toward an object on the target surface;
- determining, with at least one processor, that the at least one movable finger has grasped the object on the target surface;
- in response to determining that the at least one movable finger has grasped the object on the target surface, maintaining a driving current on the at least one motor to retain the object in the at least one movable finger;
- determining, with at least one processor, a winding temperature of the at least one motor;
- determining, with at least one processor, that the winding temperature exceeds a predetermined threshold; and
- in response to determining that the winding temperature exceeds the predetermined threshold, releasing the object held by the at least one movable finger.

11. The method of claim 10, further comprising:
- predicting, with at least one processor, a change in the winding temperature of the at least one motor based on a planned movement of the at least one movable finger; and
- altering, with at least one processor, the planned movement to prevent the winding temperature from exceeding a predetermined threshold.

12. The method of claim 10, wherein the determining that the at least one movable finger is in contact with the target surface comprises detecting angular displacement of the at least one motor.

13. The method of claim 10, wherein the determining that the at least one movable finger is in contact with the target surface comprises detecting a load above a predetermined threshold on the at least one motor.

14. The method of claim 10, wherein determining that the at least one movable finger has grasped the object on the target surface comprises detecting a load above a predetermined threshold on at least one of a first motor and a second motor of the at least one motor.

* * * * *